United States Patent
Sakri et al.

(10) Patent No.: US 9,668,048 B2
(45) Date of Patent: May 30, 2017

(54) CONTEXTUAL SWITCHING OF MICROPHONES

(71) Applicant: Knowles Electronics, LLC, Itasca, IL (US)

(72) Inventors: Shailesh Sakri, Fremont, CA (US); Ajay Kumar Dhanapalan, San Jose, CA (US); Harsha Inna Kedage Rao, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 15/011,287

(22) Filed: Jan. 29, 2016

(65) Prior Publication Data

US 2016/0227336 A1    Aug. 4, 2016

Related U.S. Application Data

(60) Provisional application No. 62/110,171, filed on Jan. 30, 2015.

(51) Int. Cl.
*H04R 29/00* (2006.01)
*H04B 3/20* (2006.01)
(Continued)

(52) U.S. Cl.
CPC .............. *H04R 3/005* (2013.01); *H04M 9/08* (2013.01); *H04R 2410/05* (2013.01); *H04R 2499/11* (2013.01)

(58) Field of Classification Search
CPC .. H04R 29/005; H04R 3/005; H04R 2410/01; H04R 2499/11
(Continued)

(56) References Cited

U.S. PATENT DOCUMENTS

| 4,025,724 A | 5/1977 | Davidson, Jr. et al. |
| 4,802,227 A | 1/1989 | Elko et al. |

(Continued)

FOREIGN PATENT DOCUMENTS

| EP | 1536660 A2 | 6/2005 |
| FI | 20125600 A | 6/2012 |

(Continued)

OTHER PUBLICATIONS

International Search Report and Written Opinion mailed May 23, 2012 in Patent Cooperation Treaty Application No. PCT/US2012/020365, filed May 1, 2012.
(Continued)

*Primary Examiner* — Thjuan K Addy
(74) *Attorney, Agent, or Firm* — Foley & Lardner LLP

(57) ABSTRACT

Provided are systems and methods for contextual switching of microphones in audio devices. An example method includes detecting a change in conditions for capturing an acoustic signal by at least two microphones. A configuration is associated with the at least two microphones. The example method provides determining that the change in conditions has been stable for a pre-determined period of time. In response to the determination, the method changes the configuration associated with the at least two microphones. The conditions may include an absence or presence of far-end speech, reverberation, low/high signal-to-noise ratio, low/high signal-to-echo ratio, type of background noise, and so on. The changing of the configuration includes assigning a primary microphone and a secondary microphone based on a change in conditions. Based on the changed configuration, tuning parameters may be adjusted for noise suppression and acoustic echo cancellation.

20 Claims, 7 Drawing Sheets

(51) Int. Cl.
*A61F 11/06* (2006.01)
*G10K 11/16* (2006.01)
*H03B 29/00* (2006.01)
*H04R 3/00* (2006.01)
*H04M 9/08* (2006.01)

(58) Field of Classification Search
USPC ....... 381/58, 71.4, 66, 71.14, 71.1, 71.8, 92, 381/94.1; 455/570
See application file for complete search history.

(56) References Cited

U.S. PATENT DOCUMENTS

| | | |
|---|---|---|
| 4,969,203 A | 11/1990 | Herman |
| 5,115,404 A | 5/1992 | Lo et al. |
| 5,289,273 A | 2/1994 | Lang |
| 5,440,751 A | 8/1995 | Santeler et al. |
| 5,544,346 A | 8/1996 | Amini et al. |
| 5,555,306 A | 9/1996 | Gerzon |
| 5,625,697 A | 4/1997 | Bowen et al. |
| 5,715,319 A | 2/1998 | Chu |
| 5,734,713 A | 3/1998 | Mauney et al. |
| 5,774,837 A | 6/1998 | Yeldener et al. |
| 5,819,215 A | 10/1998 | Dobson et al. |
| 5,850,453 A | 12/1998 | Klayman et al. |
| 5,978,567 A | 11/1999 | Rebane et al. |
| 5,991,385 A | 11/1999 | Dunn et al. |
| 6,011,853 A | 1/2000 | Koski et al. |
| 6,035,177 A | 3/2000 | Moses et al. |
| 6,065,883 A | 5/2000 | Herring et al. |
| 6,084,916 A | 7/2000 | Ott |
| 6,144,937 A | 11/2000 | Ali |
| 6,188,769 B1 | 2/2001 | Jot et al. |
| 6,219,408 B1 | 4/2001 | Kurth |
| 6,281,749 B1 | 8/2001 | Klayman et al. |
| 6,327,370 B1 | 12/2001 | Killion et al. |
| 6,381,284 B1 | 4/2002 | Strizhevskiy |
| 6,381,469 B1 | 4/2002 | Wojick |
| 6,389,142 B1 | 5/2002 | Hagen et al. |
| 6,480,610 B1 | 11/2002 | Fang et al. |
| 6,504,926 B1 | 1/2003 | Edelson et al. |
| 6,615,169 B1 | 9/2003 | Ojala et al. |
| 6,717,991 B1 | 4/2004 | Gustafsson et al. |
| 6,748,095 B1 | 6/2004 | Goss |
| 6,768,979 B1 | 7/2004 | Menendez-Pidal et al. |
| 6,873,837 B1 | 3/2005 | Yoshioka et al. |
| 6,882,736 B2 | 4/2005 | Dickel et al. |
| 6,931,123 B1 | 8/2005 | Hughes |
| 6,980,528 B1 | 12/2005 | LeBlanc et al. |
| 7,010,134 B2 | 3/2006 | Jensen |
| RE39,080 E | 4/2006 | Johnston |
| 7,028,547 B2 | 4/2006 | Shiratori et al. |
| 7,035,666 B2 | 4/2006 | Silberfenig et al. |
| 7,058,572 B1 | 6/2006 | Nemer |
| 7,103,176 B2 | 9/2006 | Rodriguez et al. |
| 7,145,710 B2 | 12/2006 | Holmes |
| 7,171,008 B2 | 1/2007 | Elko |
| 7,190,775 B2 | 3/2007 | Rambo |
| 7,221,622 B2 | 5/2007 | Matsuo et al. |
| 7,245,710 B1 | 7/2007 | Hughes |
| 7,447,631 B2 | 11/2008 | Truman et al. |
| 7,548,791 B1 | 6/2009 | Johnston |
| 7,562,140 B2 | 7/2009 | Clemm et al. |
| 7,617,282 B2 | 11/2009 | Han |
| 7,664,495 B1 | 2/2010 | Bonner et al. |
| 7,685,132 B2 | 3/2010 | Hyman |
| 7,773,741 B1 | 8/2010 | LeBlanc et al. |
| 7,791,508 B2 | 9/2010 | Wegener |
| 7,796,978 B2 | 9/2010 | Jones et al. |
| 7,899,565 B1 | 3/2011 | Johnston |
| 7,940,986 B2 | 5/2011 | Mekenkamp et al. |
| 7,970,123 B2 | 6/2011 | Beaucoup |
| 7,978,178 B2 | 7/2011 | Pehlivan et al. |
| 8,036,767 B2 | 10/2011 | Souldore |
| 8,175,291 B2 | 5/2012 | Chan et al. |
| 8,189,429 B2 | 5/2012 | Chen et al. |
| 8,194,880 B2 | 6/2012 | Avendano |
| 8,204,253 B1 | 6/2012 | Solbach |
| 8,229,137 B2 | 7/2012 | Romesburg |
| 8,233,352 B2 | 7/2012 | Beaucoup |
| 8,363,823 B1 | 1/2013 | Santos |
| 8,369,973 B2 | 2/2013 | Risbo |
| 8,467,891 B2 | 6/2013 | Huang et al. |
| 8,531,286 B2 | 9/2013 | Friar et al. |
| 8,606,249 B1 | 12/2013 | Goodwin |
| 8,615,392 B1 | 12/2013 | Goodwin |
| 8,615,394 B1 | 12/2013 | Avendano et al. |
| 8,639,516 B2 | 1/2014 | Lindahl et al. |
| 8,694,310 B2 | 4/2014 | Taylor |
| 8,705,759 B2 | 4/2014 | Wolff et al. |
| 8,712,069 B1 | 4/2014 | Murgia et al. |
| 8,750,526 B1 | 6/2014 | Santos et al. |
| 8,774,423 B1 | 7/2014 | Solbach |
| 8,775,128 B2 | 7/2014 | Meduna et al. |
| 8,798,290 B1 | 8/2014 | Choi et al. |
| 8,903,721 B1 | 12/2014 | Cowan |
| 9,007,416 B1 | 4/2015 | Murgia et al. |
| 9,197,974 B1 | 11/2015 | Clark et al. |
| 9,210,503 B2 | 12/2015 | Avendano et al. |
| 9,438,992 B2 * | 9/2016 | Every ................ G10L 21/0208 |
| 2002/0041678 A1 | 4/2002 | Basburg-Ertem et al. |
| 2002/0071342 A1 | 6/2002 | Marple et al. |
| 2002/0138263 A1 | 9/2002 | Deligne et al. |
| 2002/0160751 A1 | 10/2002 | Sun et al. |
| 2002/0177995 A1 | 11/2002 | Walker |
| 2003/0023430 A1 | 1/2003 | Wang et al. |
| 2003/0056220 A1 | 3/2003 | Thornton et al. |
| 2003/0093279 A1 | 5/2003 | Malah et al. |
| 2003/0099370 A1 | 5/2003 | Moore |
| 2003/0107888 A1 | 6/2003 | Devlin et al. |
| 2003/0118200 A1 | 6/2003 | Beaucoup et al. |
| 2003/0147538 A1 | 8/2003 | Elko |
| 2003/0177006 A1 | 9/2003 | Ichikawa et al. |
| 2003/0179888 A1 | 9/2003 | Burnett et al. |
| 2004/0001450 A1 | 1/2004 | He et al. |
| 2004/0066940 A1 | 4/2004 | Amir |
| 2004/0076190 A1 | 4/2004 | Goel et al. |
| 2004/0102967 A1 | 5/2004 | Furuta et al. |
| 2004/0145871 A1 | 7/2004 | Lee |
| 2004/0184882 A1 | 9/2004 | Cosgrove |
| 2005/0008169 A1 | 1/2005 | Muren et al. |
| 2005/0033200 A1 | 2/2005 | Soehren et al. |
| 2005/0080616 A1 | 4/2005 | Leung et al. |
| 2005/0094610 A1 | 5/2005 | de Clerq et al. |
| 2005/0114123 A1 | 5/2005 | Lukac et al. |
| 2005/0172311 A1 | 8/2005 | Hjelt et al. |
| 2005/0213739 A1 | 9/2005 | Rodman et al. |
| 2005/0240399 A1 | 10/2005 | Makinen |
| 2005/0249292 A1 | 11/2005 | Zhu |
| 2005/0261896 A1 | 11/2005 | Schuijers et al. |
| 2005/0267369 A1 | 12/2005 | Lazenby et al. |
| 2005/0276363 A1 | 12/2005 | Joublin et al. |
| 2005/0281410 A1 | 12/2005 | Grosvenor et al. |
| 2005/0283544 A1 | 12/2005 | Yee |
| 2006/0063560 A1 | 3/2006 | Herle |
| 2006/0092918 A1 | 5/2006 | Talalai |
| 2006/0100868 A1 | 5/2006 | Hetherington et al. |
| 2006/0122832 A1 | 6/2006 | Takiguchi et al. |
| 2006/0136203 A1 | 6/2006 | Ichikawa |
| 2006/0206320 A1 | 9/2006 | Li |
| 2006/0224382 A1 | 10/2006 | Taneda |
| 2006/0282263 A1 | 12/2006 | Vos et al. |
| 2007/0003097 A1 | 1/2007 | Langberg et al. |
| 2007/0005351 A1 | 1/2007 | Sathyendra et al. |
| 2007/0025562 A1 | 2/2007 | Zalewski et al. |
| 2007/0033020 A1 | 2/2007 | Francois et al. |
| 2007/0041589 A1 | 2/2007 | Patel et al. |
| 2007/0058822 A1 | 3/2007 | Ozawa |
| 2007/0064817 A1 | 3/2007 | Dunne et al. |
| 2007/0081075 A1 | 4/2007 | Canova, Jr. et al. |
| 2007/0127668 A1 | 6/2007 | Ahya et al. |
| 2007/0185587 A1 | 8/2007 | Kondo |
| 2007/0253574 A1 | 11/2007 | Soulodre |
| 2007/0273583 A1 | 11/2007 | Rosenberg |

(56) References Cited

U.S. PATENT DOCUMENTS

| | | |
|---|---|---|
| 2007/0282604 A1 | 12/2007 | Gartner et al. |
| 2007/0287490 A1 | 12/2007 | Green et al. |
| 2008/0069366 A1 | 3/2008 | Soulodre |
| 2008/0111734 A1 | 5/2008 | Fam et al. |
| 2008/0159507 A1 | 7/2008 | Virolainen et al. |
| 2008/0160977 A1 | 7/2008 | Ahmaniemi et al. |
| 2008/0187143 A1 | 8/2008 | Mak-Fan |
| 2008/0192955 A1 | 8/2008 | Merks |
| 2008/0233934 A1 | 9/2008 | Diethorn |
| 2008/0247567 A1 | 10/2008 | Kjolerbakken et al. |
| 2008/0259731 A1 | 10/2008 | Happonen |
| 2008/0298571 A1 | 12/2008 | Kurtz et al. |
| 2008/0304677 A1 | 12/2008 | Abolfathi et al. |
| 2008/0317259 A1 | 12/2008 | Zhang et al. |
| 2009/0034755 A1 | 2/2009 | Short et al. |
| 2009/0060222 A1 | 3/2009 | Jeong et al. |
| 2009/0063143 A1 | 3/2009 | Schmidt et al. |
| 2009/0089054 A1 | 4/2009 | Wang et al. |
| 2009/0116656 A1 | 5/2009 | Lee et al. |
| 2009/0134829 A1 | 5/2009 | Baumann et al. |
| 2009/0141908 A1 | 6/2009 | Jeong et al. |
| 2009/0147942 A1 | 6/2009 | Culter |
| 2009/0150149 A1 | 6/2009 | Culter et al. |
| 2009/0164905 A1 | 6/2009 | Ko |
| 2009/0167862 A1 | 7/2009 | Jentoft et al. |
| 2009/0192791 A1 | 7/2009 | El-Maleh et al. |
| 2009/0204413 A1 | 8/2009 | Sintes et al. |
| 2009/0226010 A1 | 9/2009 | Schnell et al. |
| 2009/0240497 A1 | 9/2009 | Usher et al. |
| 2009/0264114 A1 | 10/2009 | Virolainen et al. |
| 2009/0303350 A1 | 12/2009 | Terada |
| 2009/0323655 A1 | 12/2009 | Cardona et al. |
| 2009/0323925 A1 | 12/2009 | Sweeney et al. |
| 2009/0323981 A1 | 12/2009 | Cutler |
| 2009/0323982 A1 | 12/2009 | Solbach et al. |
| 2010/0017205 A1 | 1/2010 | Visser et al. |
| 2010/0033427 A1 | 2/2010 | Marks et al. |
| 2010/0036659 A1 | 2/2010 | Haulick et al. |
| 2010/0081487 A1 | 4/2010 | Chen et al. |
| 2010/0092007 A1 | 4/2010 | Sun |
| 2010/0105447 A1 | 4/2010 | Sibbald et al. |
| 2010/0128123 A1 | 5/2010 | DiPoala |
| 2010/0130198 A1 | 5/2010 | Kannappan et al. |
| 2010/0134241 A1 | 6/2010 | Gips et al. |
| 2010/0157168 A1 | 6/2010 | Dunton et al. |
| 2010/0174506 A1 | 7/2010 | Joseph et al. |
| 2010/0210975 A1 | 8/2010 | Anthony et al. |
| 2010/0215184 A1 | 8/2010 | Buck et al. |
| 2010/0217837 A1 | 8/2010 | Ansari et al. |
| 2010/0245624 A1 | 9/2010 | Beaucoup |
| 2010/0278352 A1 | 11/2010 | Petit et al. |
| 2010/0303298 A1 | 12/2010 | Marks et al. |
| 2010/0315482 A1 | 12/2010 | Rosenfeld et al. |
| 2011/0038486 A1 | 2/2011 | Beaucoup |
| 2011/0038557 A1 | 2/2011 | Closset et al. |
| 2011/0044324 A1 | 2/2011 | Li et al. |
| 2011/0075857 A1 | 3/2011 | Aoyagi |
| 2011/0081024 A1 | 4/2011 | Soulodre |
| 2011/0081026 A1 | 4/2011 | Ramakrishnan et al. |
| 2011/0107367 A1 | 5/2011 | Georgis et al. |
| 2011/0125063 A1 | 5/2011 | Shalon et al. |
| 2011/0129095 A1 | 6/2011 | Avendano et al. |
| 2011/0173006 A1 | 7/2011 | Nagel et al. |
| 2011/0173621 A1 | 7/2011 | Imes et al. |
| 2011/0182436 A1 | 7/2011 | Murgia et al. |
| 2011/0191101 A1 | 8/2011 | Uhle et al. |
| 2011/0224994 A1 | 9/2011 | Norvell et al. |
| 2011/0280154 A1 | 11/2011 | Silverstrim et al. |
| 2011/0286605 A1 | 11/2011 | Furuta et al. |
| 2011/0300806 A1 | 12/2011 | Lindahl et al. |
| 2011/0305345 A1 | 12/2011 | Bouchard et al. |
| 2012/0027217 A1 | 2/2012 | Jun et al. |
| 2012/0050582 A1 | 3/2012 | Seshadri et al. |
| 2012/0062729 A1 | 3/2012 | Hart et al. |
| 2012/0116769 A1 | 5/2012 | Malah et al. |
| 2012/0133728 A1 | 5/2012 | Lee |
| 2012/0169482 A1 | 7/2012 | Chen et al. |
| 2012/0182429 A1 | 7/2012 | Forutanpour et al. |
| 2012/0202485 A1 | 8/2012 | Mirbaha et al. |
| 2012/0209611 A1 | 8/2012 | Furuta et al. |
| 2012/0231778 A1 | 9/2012 | Chen et al. |
| 2012/0249785 A1 | 10/2012 | Sudo et al. |
| 2012/0250882 A1 | 10/2012 | Mohammad et al. |
| 2012/0257778 A1 | 10/2012 | Hall et al. |
| 2012/0265716 A1 | 10/2012 | Hunzinger et al. |
| 2012/0316784 A1 | 12/2012 | Chrysanthakopoulos |
| 2012/0317149 A1 | 12/2012 | Jagota et al. |
| 2013/0034243 A1 | 2/2013 | Yermeche et al. |
| 2013/0051543 A1 | 2/2013 | McDysan et al. |
| 2013/0080843 A1 | 3/2013 | Stergiou et al. |
| 2013/0182857 A1 | 7/2013 | Namba et al. |
| 2013/0282372 A1 | 10/2013 | Visser et al. |
| 2013/0322461 A1 | 12/2013 | Poulsen |
| 2013/0325616 A1 | 12/2013 | Ramde et al. |
| 2013/0332156 A1 | 12/2013 | Tackin et al. |
| 2013/0332171 A1 | 12/2013 | Avendano et al. |
| 2014/0003622 A1 | 1/2014 | Ikizyan et al. |
| 2014/0129178 A1 | 5/2014 | Meduna et al. |
| 2014/0181715 A1 | 6/2014 | Axelrod et al. |
| 2014/0187258 A1 | 7/2014 | Khorashadi et al. |
| 2014/0274218 A1* | 9/2014 | Kadiwala ............ H04M 1/6041 455/570 |
| 2015/0012248 A1 | 1/2015 | Meduna et al. |

FOREIGN PATENT DOCUMENTS

| | | |
|---|---|---|
| JP | H05300419 A | 11/1993 |
| JP | H07336793 A | 12/1995 |
| JP | 2006515490 A | 5/2006 |
| JP | 2007201818 A | 8/2007 |
| JP | 2008542798 A | 11/2008 |
| JP | 2009037042 A | 2/2009 |
| JP | 2013513306 A | 4/2013 |
| JP | 5855571 B2 | 12/2015 |
| KR | 1020120101457 | 9/2012 |
| TW | 201043475 A | 12/2011 |
| WO | WO8400634 | 2/1984 |
| WO | WO2004047011 A2 | 6/2004 |
| WO | WO2008034221 A1 | 3/2008 |
| WO | WO2009093161 A1 | 7/2009 |
| WO | WO2009132920 A1 | 11/2009 |
| WO | WO2011068901 A1 | 6/2011 |
| WO | WO2011092549 A1 | 8/2011 |
| WO | WO2012094522 A1 | 7/2012 |
| WO | WO2013188562 A2 | 12/2013 |
| WO | WO2014074268 A1 | 5/2014 |
| WO | WO2014127543 A1 | 8/2014 |

OTHER PUBLICATIONS

Hjorth, Bo. "EEG Analysis Based on Time Domain Properties." Electroencephalography and Clinical Neurophysiology, vol. 29, No. 3 (1970). pp. 306-310.

Hjorth, Bo. "The Physical Significance of Time Domain Descriptions in EEG Analysis," Electroencephalography and Clinical Neurophysiology, vol. 34, No. 3, (1973). pp. 321-325.

Hjorth, Bo. "An On-line Transformation of EEG Scalp Potentials into Orthogonal Source Derivations," Electroencephalography and Clinical Neurophysiology, vol. 39, No. 5 (1975). pp. 526-530.

Jimenez et al., "A Comparison of Pedestrian Dead-Reckoning Algorithms Using a Low-Cost MEMS IMU," WISP 2009. 6th IEEE International Symposium on Intelligent Signal Processing, Aug. 26-28, 2009. pp. 37-42.

International Search Report and Written Opinion mailed May 7, 2014 in Patent Cooperation Treaty Application No. PCT/US2013/064645 filed Oct. 11, 2013.

International Search Report and Written Opinion mailed Apr. 8, 2016 in Patent Cooperation Treaty Application No. PCT/US2016/015801.

Non-Final Office Action, May 9, 2014, U.S. Appl. No. 13/343,654, filed Jan. 4, 2012.

(56) References Cited

OTHER PUBLICATIONS

Final Office Action, Aug. 4, 2014, U.S. Appl. No. 13/343,654, Jan. 4, 2012.
Non-Final Office Action, Feb. 26, 2015, U.S. Appl. No. 13/343,654, filed Jan. 4, 2012.
Final Office Action, Sep. 8, 2015, U.S. Appl. No. 13/343,654, Jan. 4, 2012.
Non-Final Office Action, Dec. 17, 2014, U.S. Appl. No. 14/321,707, filed Jul. 1, 2014.
Final Office Action, Aug. 7, 2015, U.S. Appl. No. 14/321,707, filed Jul. 1, 2014.
Non-Final Office Action, Mar. 18, 2016, U.S. Appl. No. 14/321,707, filed Jul. 1, 2014.
Non-Final Office Action, Mar. 31, 2016, U.S. Appl. No. 14/683,057, filed Apr. 9, 2015.
International Search Report and Written Opinion dated Feb. 7, 2011 in Patent Cooperation Treaty Application No. PCT/US10/58600.
International Search Report dated Dec. 20, 2013 in Patent Cooperation Treaty Application No. PCT/US2013/045462, filed Jun. 12, 2013.
Office Action dated Aug. 26, 2014 in Japan Application No. 2012-542167, filed Dec. 1, 2010.
Office Action mailed Oct. 31, 2014 in Finland Patent Application No. 20125600, filed Jun. 1, 2012.
Office Action mailed Jul. 21, 2015 in Japan Patent Application No. 2012-542167, filed Dec. 1, 2010.
Office Action mailed Sep. 29, 2015 in Finland Patent Application No. 20125600, filed Dec. 1, 2010.
Allowance mailed Nov. 17, 2015 in Japan Patent Application No. 2012-542167, filed Dec. 1, 2010.
International Search Report & Written Opinion dated Dec. 14, 2015 in Patent Cooperation Treaty Application No. PCT/US2015/049816, filed Sep. 11, 2015.
International Search Report & Written Opinion dated Dec. 22, 2015 in Patent Cooperation Treaty Application No. PCT/US2015/052433, filed Sep. 25, 2015.
International Search Report & Written Opinion dated Feb. 11, 2016 in Patent Cooperation Treaty Application No. PCT/US2015/063519, filed Dec. 2, 2015.

* cited by examiner

CONTEXTUAL SWITCHING OF MICROPHONES

CROSS-REFERENCE TO RELATED APPLICATION

The present application claims the benefit of U.S. Provisional Patent Application No. 62/110,171, filed Jan. 30, 2015. The subject matter of the aforementioned application is incorporated herein by reference for all purposes.

FIELD

The present application relates generally to audio processing and, more particularly, to systems and methods for contextual switching of microphones.

BACKGROUND

It is common for devices such as mobile phones, personal computers (PCs), tablet computers, gaming consoles, and wearables to have more than one microphone and one or more loudspeakers. With every advancing generation of the devices, the market focus has been on enhancing the end-user experience. It may be not feasible to place microphones at desired locations on a mobile phone or other devices due to, for example, waterproof designs, a single piece of glass design, curved screens, battery placement, location of camera, heart rate sensor, speaker size, Infrared (IR)/proximity/humidity/magnetic sensors, and so forth. These enhancements can make a desired performance challenging in various scenarios. For example, given the form factor of a device and the location of microphones and loudspeakers on the device, it is often difficult to achieve the desired noise suppression (NS) and acoustic echo cancellation (AEC) using the same microphone as the primary microphone in different scenarios.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for contextual switching of microphones. An example method includes detecting a change of conditions for capturing an acoustic signal by at least two microphones, a configuration being associated with the at least two microphones. The method allows determining that the change of conditions has been stable such that the change has occurred for a pre-determined period of time. In response to the determination, the method includes changing the configuration associated with the at least two microphones.

In various embodiments, the microphones include at least a first microphone and a second microphone. The configuration may include having the first microphone assigned to function as a primary microphone and having the second microphone assigned to function as a secondary microphone. In other embodiments, changing the configuration includes assigning the first microphone to function as the secondary microphone and assigning the second microphone to function as the primary microphone.

In some embodiments, the method further includes adjusting tuning parameters for noise suppression (NS) based on the changed configuration. In certain other embodiments, the method further includes adjusting tuning parameters for acoustic echo cancellation (AEC) based on the changed configuration.

In other embodiments, detecting the change of the conditions includes detecting that the first microphone is occluded and the second microphone is not occluded. Occlusion may be detected, for example, based on the microphone energy level. Changing the configuration may include assigning the second microphone to function as a primary microphone.

In some embodiments, detecting the change of the conditions includes detecting presence of a reverberation. The at least two microphones may comprise at least three microphones. In response to the detecting of the presence of the reverberation, changing the configuration includes selecting a first microphone and a second microphone from the at least three microphones for capturing the acoustic signal. The first microphone and the second microphone may be a pair of the microphones that are separated by a maximum distance.

In various embodiments, the conditions are associated with at least one of the following: absence or presence of far-end speech, a type of background noise, sensitivities of the at least two microphones, and seals of the at least two microphones.

In some embodiments, determining the conditions includes one or more of the following: determining a level of signal-to-noise ratio (SNR) in the acoustic signal and determining a level of signal-to-echo ratio (SER) in the acoustic signal.

According to another example embodiment of the present disclosure, the steps of the method for contextual switching of microphones are stored on a machine-readable medium comprising instructions, which, when implemented by one or more processors, perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The technology disclosed herein relates to systems and methods for contextual switching of microphones. Embodiments of the present technology may be practiced with audio devices operable at least to capture and process acoustic signals.

According to an example embodiment, a method for contextual switching of microphones includes detecting a change of conditions for capturing an acoustic signal by at least two microphones. The method allows determining that the change of conditions has been stable for a pre-determined period of time. In response to the determination, the method enables changing the configuration associated with the at least two microphones.

Figure 1:
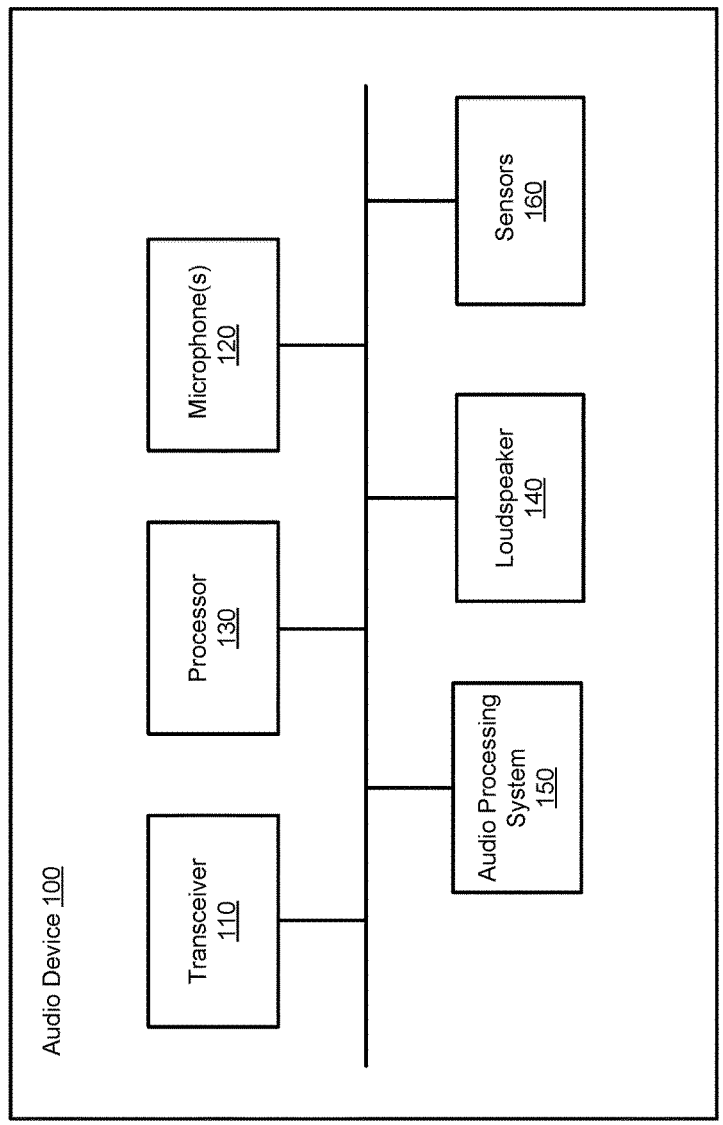
FIG. 1 is a block diagram of an exemplary audio device.

FIG. 1 is a block diagram illustrating an example audio device 100 suitable for implementing a method for contextual switching of microphones, according to some embodiments. The example audio device 100 includes a (radio) transceiver 110, a processor 130, microphones 120 (also further referred to as microphones 120a, 120b, 120c, and so forth), a loudspeaker 140, an audio processing system 150, and sensors 160. In other embodiments, the audio device 100 includes more or other components to provide a particular operation or functionality. Similarly, the audio device 100 may include fewer components that perform similar or equivalent functions to those depicted in FIG. 1.

In some embodiments, the transceiver 110 is configured to communicate with a network such as the Internet, Wide Area Network (WAN), Local Area Network (LAN), cellular network, and so forth, to receive and/or transmit an audio data stream. The received audio data stream may then be forwarded to the audio processing system 150 and the loudspeaker 140.

The processor 130 includes hardware and software that implement the processing of audio data and various other operations depending on a type of the audio device 100 (e.g., communication device and computer), according to some embodiments. A memory (e.g., non-transitory computer readable storage medium) is operable to store, at least in part, instructions and data for execution by processor 130.

In various embodiments, the audio processing system 150 includes hardware and software that implement the encoding of acoustic signal(s). For example, the audio processing system 150 is configured to receive acoustic signals from an acoustic source via microphone(s) 120 (which may be one or more microphones or acoustic sensors) and process the acoustic signals. After reception by the microphone(s) 120, the acoustic signals may be converted into electrical signals by an analog-to-digital converter. In some embodiments, the processing of acoustic signal(s) includes NS and/or AEC. Noise is unwanted sound including street noise, ambient noise, and speech from entities other than an intended speaker. For example, noise sources include a working air conditioner, ventilation fans, TV sets, mobile phones, stereo audio systems, and the like. Certain kinds of noise may arise from both operation of machines (for example, cars) and environments in which they operate (for example, a road, track, tire, wheel, fan, wiper blade, engine, exhaust, entertainment system, wind, rain, waves, and the like).

An example audio processing system suitable for performing noise suppression is discussed in more detail in U.S. patent application Ser. No. 12/832,901 (now U.S. Pat. No. 8,473,287), entitled "Method for Jointly Optimizing Noise Reduction and Voice Quality in a Mono or Multi-Microphone System," filed Jul. 8, 2010, the disclosure of which is incorporated herein by reference for all purposes. By way of example and not limitation, noise suppression methods are described in U.S. patent application Ser. No. 12/215,980 (now U.S. Pat. No. 9,185,487), entitled "System and Method for Providing Noise Suppression Utilizing Null Processing Noise Subtraction," filed Jun. 30, 2008, and in U.S. patent application Ser. No. 11/699,732 (now U.S. Pat. No. 8,194,880), entitled "System and Method for Utilizing Omni-Directional Microphones for Speech Enhancement," filed Jan. 29, 2007, which are incorporated herein by reference in their entireties.

The loudspeaker 140 is a device that provides an audio output to a listener. In some embodiments, the audio device 100 further includes a class-D output, an earpiece of a headset, or a handset on the audio device 100.

In various embodiments, sensors 160 include, but are not limited to, an accelerometer, magnetometer, gyroscope, Inertial Measurement Unit (IMU), temperature sensor, altitude sensor, proximity sensor, barometer, humidity sensor, color sensor, light sensor, pressure sensor, GPS module, a beacon, WiFi sensor, ultrasound sensor, infrared sensor, touch sensor, and the like. In some embodiments, the sensor data can be used to estimate conditions and context for capturing acoustic signals by microphone(s) 120.

Figure 2:
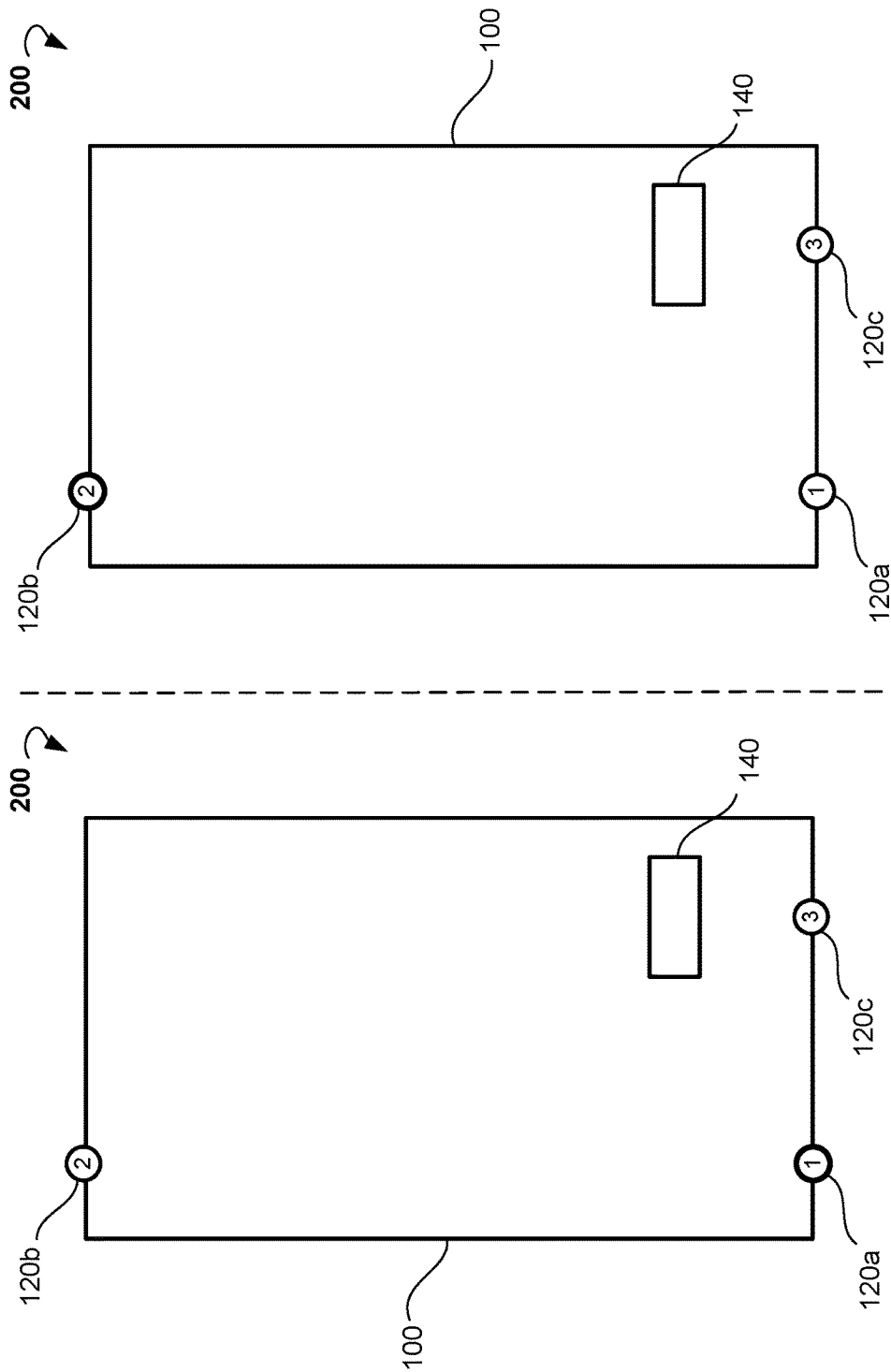
FIGS. 2A and 2B are block diagrams illustrating two configurations of microphones of an audio device, according to example embodiments.

FIGS. 2A and 2B are block diagrams illustrating two configurations of microphones 120 of the audio device 100, according to some example embodiments. In the examples shown in FIGS. 2A and 2B, the audio device 100 includes microphones 120a, 120b, and 120c (also shown in FIG. 1 as microphone(s) 120, according to certain embodiments.

In various embodiments, each of the microphones 120a, 120b, and 120c is operable to provide predetermined functionality. In a typical situation, when a user speaks during a call on the audio device 100, it is recommended that the microphone closest to a target talker's mouth is configured to serve as the primary microphone on the audio device. In this instance, as shown in FIG. 2A, the microphone 120a on the bottom-left edge of the device serves as the primary microphone ("PRI"). The inputs from microphones 120b and 120c, which serve as secondary microphone ("SEC") and tertiary microphone ("TER") respectively in this example, can be used by the audio device 100 for noise reduction and AEC in captured acoustic signal. Noise reduction may include noise cancellation and/or noise suppression.

In an exemplary scenario, when the loudspeaker 140 is active, the designated microphone 120a, which serves as the primary microphone in this example, can pick up strong echoes due to its close proximity to the loudspeaker 140. In this scenario, it is preferred that the primary microphone that is assigned to capture a target talker be the farthest microphone from the loudspeaker 140. For this example, as shown in FIG. 2B, the microphone 120b on the top edge of the audio device 100 is assigned to serve as the primary microphone (in contrast to the example shown in FIG. 2A where the microphone 120a serves as the primary microphone).

According to various embodiments, the technologies described herein allow dynamically switching one or more microphone(s) based on near-end (target talker) and far-end conditions. The contextual switching can be based on one or more of the following factors: absence or presence of far-end speech (echo), absence or presence of reverberation, type of background noise, and microphone characteristics such as sensitivities and seals. In some embodiments, the contextual switching is based on values of signal-to-noise ratio (SNR) of signals captured by different microphones 120 of the audio device 100. For example, assigning which of the two microphones is a primary microphone and which is a secondary microphone can be based on determining which of the microphones 120 provides a low SNR and a high SNR at the current moment. Similarly, in certain embodiments, the contextual microphone switching is based on a signalto-echo ratio (SER) in signals captured by different microphones 120 of audio device 100.

In some embodiments, one of the microphones 120, for example microphone 120a, can be occluded. For example, the microphone located at the bottom of the audio device 100 (the microphone 120a in FIGS. 2A and 2B) can be obstructed when the audio device 100 is inserted into a cup holder inside a car. In this situation, another microphone, for example microphone 120b, which is located at the opposite side of the audio device 100, can be assigned (configured) to be a primary microphone (as shown in FIG. 2B) and the microphone 120a can be assigned to be a secondary microphone.

Figure 3:
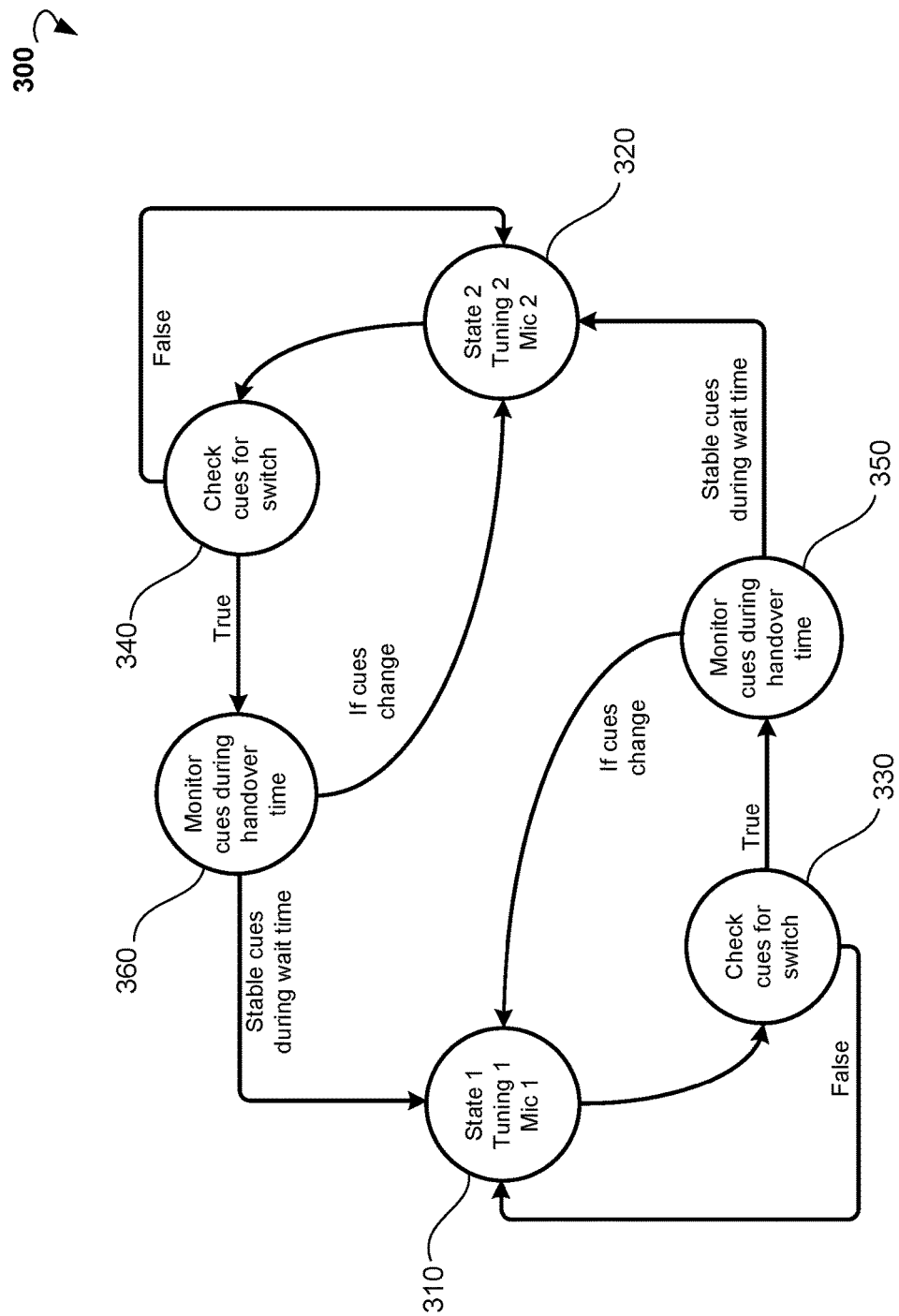
FIG. 3 is a block diagram illustrating states associated with configurations of microphones and transitions between the states, according to an example embodiment.

FIG. 3 is a block diagram 300 illustrating states associated with configurations of microphones in audio devices and transitions between the states, according to an example embodiment. The exemplary diagram of FIG. 3 includes state 310 and state 320. In some embodiments, the state 310 corresponds to a configuration in which microphone 120a (as shown in FIG. 2A) is a primary microphone, while the state 320 corresponds to a configuration in which the microphone 120b (as shown in FIG. 2B) is the primary microphone. In other embodiments, each of the states 310 and 320 is associated with a set of tuning parameters for NS and AEC.

In various embodiments, the two states 310 and 320 in FIG. 3 differ by one or more of the following:

1) Tuning for aggressiveness of NS: more aggressive in low SNR conditions and less suppression in high SNR conditions for stationary or non-stationary distractors;

2) Robust tuning for AEC: based on detection of far-end activity, switch primary microphone to be farthest from the loudspeaker or adjust gains on the microphone closest to the loudspeaker to avoid clipping;

3) Reverberant conditions: when reverberant conditions are detected, use microphones that are separated by a maximum distance to remove reverberation from a target speech; and 4) Microphone occlusion: if the microphone is occluded due to a mobile phone case, a user's hand, or a cup holder covering the microphone, switch to using available non-occluded microphone(s).

Condition cues for switching between the states are checked in blocks 330 and 340, which are also referred to as "Check cues for switch" blocks. In the blocks 330 and 340, raw features are used for recognizing conditions for making a switch between the states. In various embodiments, the subset of cues used for making the decision includes, but is not limited to:

1) Pitch;
2) SNR;
3) SER;
4) Coherence;
5) Type of noise source (e.g., train, car, pub, library, cafeteria, airport, etc.);
6) Microphone energy levels; and
7) Detection of reverberant conditions.

If conditions for a switch are met, then in blocks 350 and 360, a check for the stability of cues for a pre-determined period of time is executed. In various embodiments, the pre-determined period of time is in a range from approximately 20 milliseconds-50 milliseconds. The transition between the state 310 and the state 320 is executed in response to the conditions for a switch being met for a pre-determined amount of time. Otherwise, the existing configuration of microphones and the associated tuning parameters continue to be used.

Figure 4:
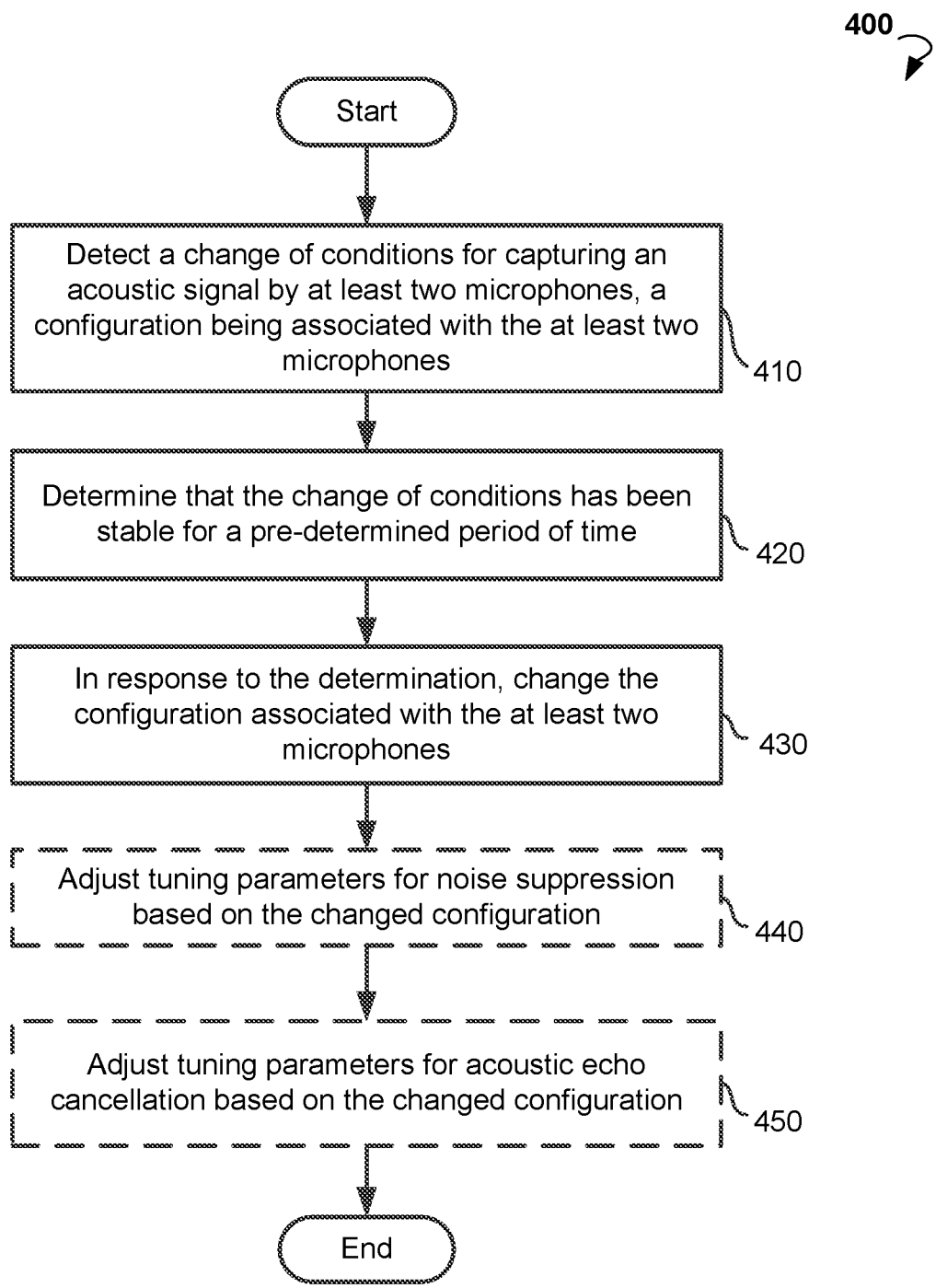
FIG. 4 is a flow chart of an exemplary method for contextual switching of microphones, according to an example embodiment.

FIG. 4 is a flow chart showing an example method 400 for contextual switching of microphones, according to various example embodiments. The example method 400 may be implemented with audio device 100. The example method 400 commences with detecting a change of conditions for capturing an acoustic signal by at least two microphones, a configuration being associated with the at least two microphones, in block 410. The conditions can be characterized by an absence or presence of far-end speech, a type of background noise, sensitivities of the at least two microphones, and seals of the at least two microphones. In certain embodiments, the conditions are associated with low or high SNR in the acoustic signal and low or high SER in the acoustic signal captured by the at least two microphones.

The example method 400 includes determining that the change of conditions has been stable for a pre-determined period of time in block 420. In block 430, in response to the determination, the example method 400 includes switching a configuration associated with the microphones.

In some embodiments, the example method 400 includes optionally adjusting tuning parameters for noise suppression based on the changed configuration in block 440. In other embodiments, the example method 400 includes optionally adjusting tuning parameters for acoustic echo cancellation based on the changed configuration in block 450.

Figure 5:
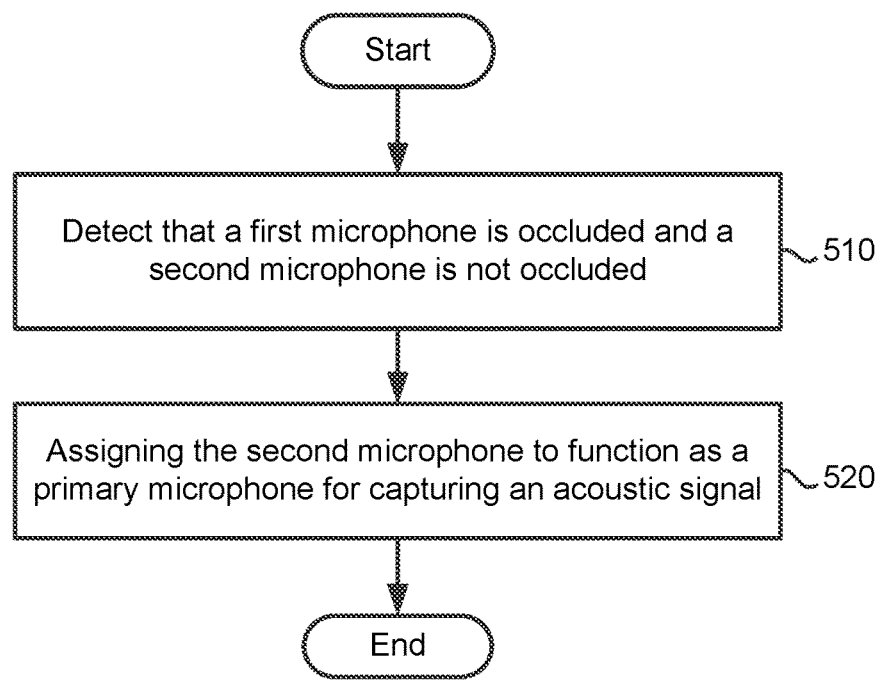
FIG. 5 is a flow chart of an exemplary method for contextual switching of microphones, according to another example embodiment.

FIG. 5 is a flow chart showing an example method 500 for contextual switching of microphones, according to some example embodiment. The example method 500 can be implemented with audio device 100. The example method 500 can commence with detecting that a first microphone from microphones of an audio device is occluded and a second microphone from the microphones is not occluded in block 510. In block 520, the example method 500 includes assigning the second microphone to function as a primary microphone for capturing an acoustic signal.

Figure 6:
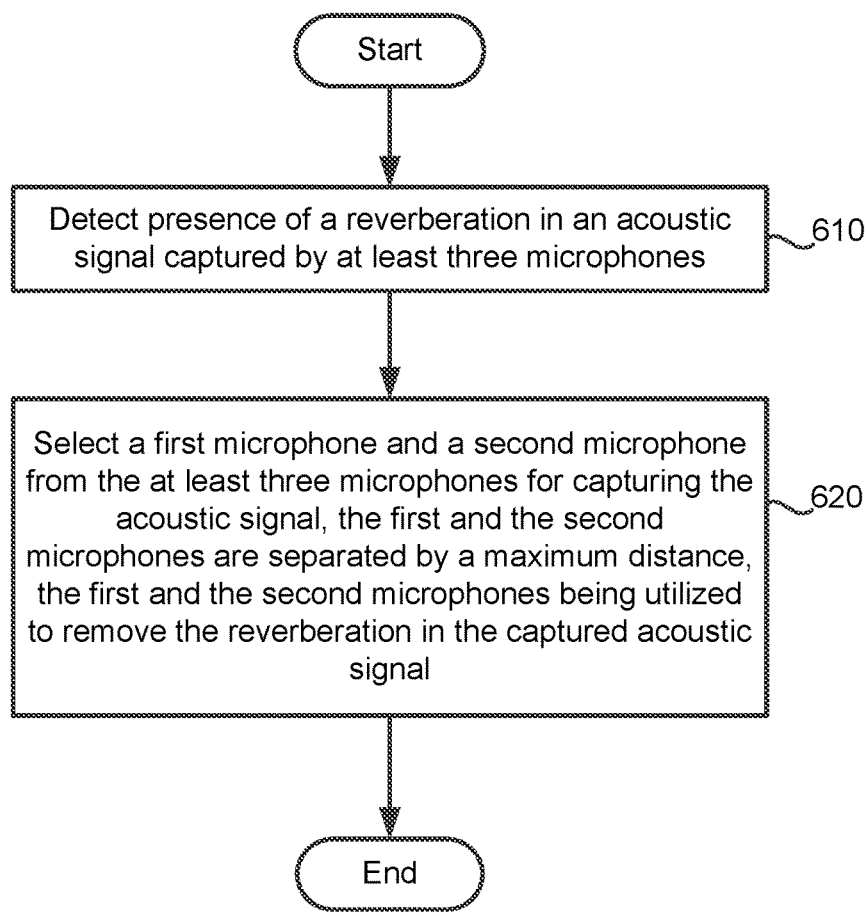
FIG. 6 is a flow chart of an exemplary method for contextual switching of microphones, according to yet another example embodiment.

FIG. 6 is a flow chart showing an example method 600 for contextual switching of microphones, according to some other example embodiments. The example method 600 can be implemented with audio device 100. The example method 600 may commence in block 610 with detecting presence of a reverberation in an acoustic signal (e.g., a target speech) captured by at least three microphones.

In block 620, the method 600 includes selecting a first microphone and a second microphone from the at least three microphones for capturing the acoustic signal. The first and the second microphones may be separated by a maximum distance, the first and the second microphones being utilized to remove the reverberation in the captured acoustic signal.

Figure 7:
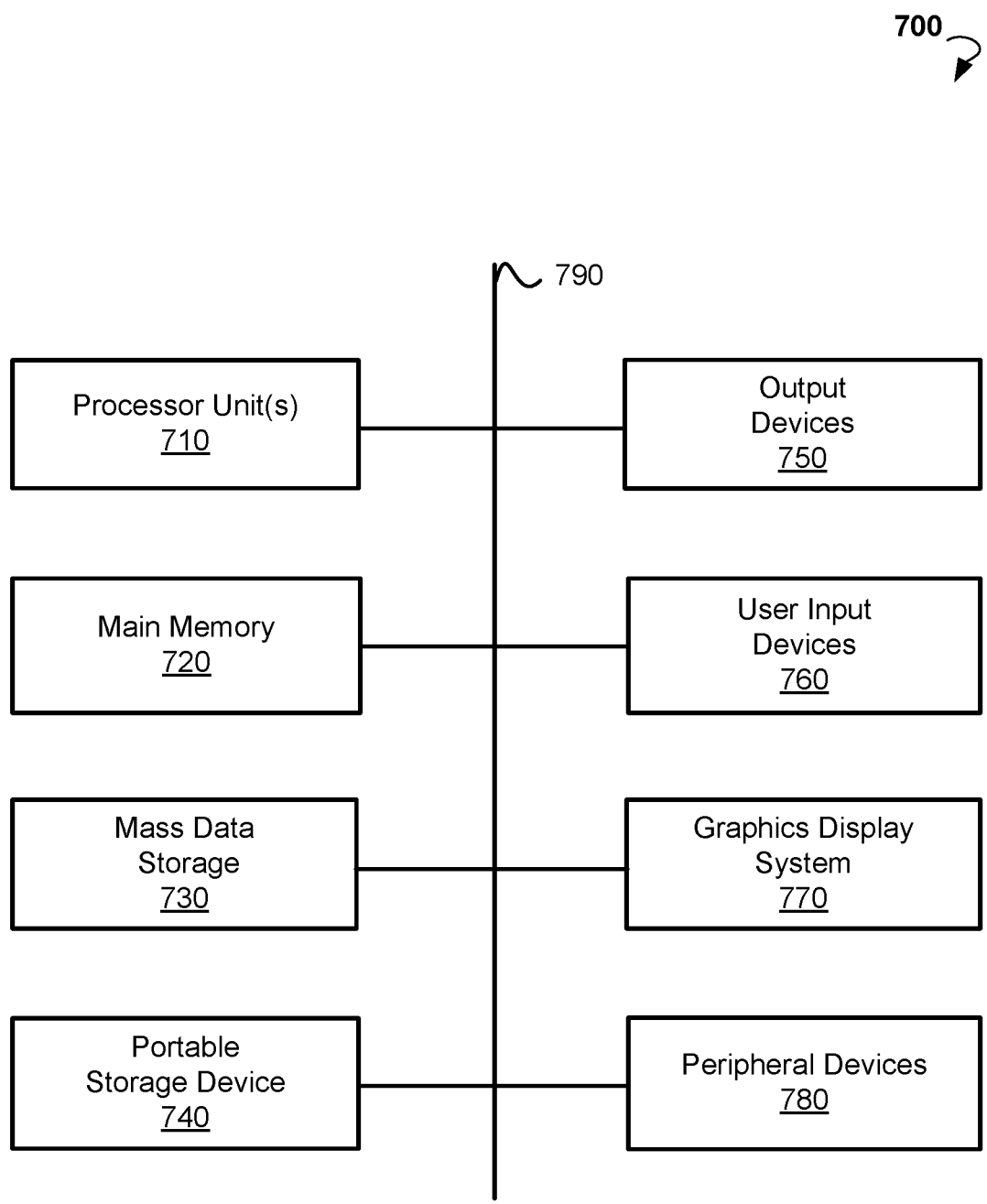
FIG. 7 illustrates an example computer system that may be used to implement embodiments of the disclosed technology.

FIG. 7 illustrates an exemplary computer system 700 that may be used to implement some embodiments of the present disclosure. The computer system 700 of FIG. 7 may be implemented in the contexts of the likes of computing systems, networks, servers, or combinations thereof. The computer system 700 of FIG. 7 includes one or more processor units 710 and main memory 720. Main memory 720 stores, in part, instructions and data for execution by processor unit(s) 710. Main memory 720 stores the executable code when in operation, in this example. The computer system 700 of FIG. 7 further includes a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 includes a liquid crystal display (LCD) or other suitable display device. Graphics display system 770 is configurable to receive textual and graphical information and process the information for output to the display device.

Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the exemplary embodiments are intended to be covered by the present disclosure.

What is claimed is:

1. A method for contextual switching of microphones, the method comprising:
   detecting a change of conditions for capturing an acoustic signal by at least two microphones, a configuration being associated with the at least two microphones, wherein detecting the change includes detecting presence of at least one of far-end speech, type of background noise, sensitivities of the at least two microphones, seals of the at least two microphones, level of signal-to-noise ratio (SNR) in the acoustic signal, and level of signal-to-echo ratio (SER) in the acoustic signal;
   determining that the change of the conditions has occurred for a pre-determined period of time; and
   in response to the determining, changing the configuration associated with the at least two microphones.

2. The method of claim 1, wherein the configuration includes having a first microphone, of the at least two microphones, assigned to function as a primary microphone and having a second microphone, of the at least two microphones, assigned to function as a secondary microphone.

3. The method of claim 2, wherein the primary microphone is the microphone, of the at least two microphones, closest to a target talker.

4. The method of claim 2, wherein the changing the configuration comprises:
   assigning the first microphone to function as the secondary microphone; and assigning the second microphone to function as the primary microphone.

5. The method of claim 2, further comprising adjusting tuning parameters for noise suppression (NS) based on the changed configuration.

6. The method of claim 2, further comprising adjusting tuning parameters for acoustic echo cancellation (AEC) based on the changed configuration.

7. The method of claim 1, wherein the detecting the change of the conditions includes detecting that a first microphone, of the at least two microphones, is occluded and a second microphone, of the at least two microphones, is not occluded.

8. The method of claim 7, wherein the detecting that the first microphone is occluded is based on detecting the energy level of the first microphone, and the detecting that the second microphone is not occluded is based on detecting the energy level of the second microphone.

9. The method of claim 7, wherein the changing the configuration includes assigning the second microphone to function as a primary microphone.

10. The method of claim 1, wherein the detecting the change of the conditions includes detecting presence of a reverberation.

11. The method of claim 10, wherein the at least two microphones comprise at least three microphones, and wherein, in response to the detecting of the presence of the reverberation, the changing the configuration includes selecting a first microphone and a second microphone from the at least three microphones for capturing the acoustic signal, the first and the second microphones being separated by a distance that is a maximum distance between any pair of the at least three microphones.

12. A system for contextual switching of microphones, the system comprising:
at least one processor; and
a memory communicatively coupled with the at least one processor, the memory storing instructions, which, when executed by the at least processor, perform a method comprising:
detecting a change of conditions for capturing an acoustic signal by at least two microphones, a configuration being associated with the at least two microphones, wherein detecting the change includes detecting presence of at least one of far-end speech, type of background noise, sensitivities of the at least two microphones, seals of the at least two microphones, level of signal-to-noise ratio (SNR) in the acoustic signal, and level of signal-to-echo ratio (SER) in the acoustic signal;
determining that the change of the conditions has occurred for a predetermined period of time; and
in response to the determination, changing the configuration associated with the at least two microphones.

13. The system of claim 12, wherein the configuration includes having a first microphone, of the at least two microphones, assigned to function as a primary microphone and having a second microphone, of the at least two microphones, assigned to function as a secondary microphone.

14. The system of claim 13, wherein the primary microphone is the microphone, of the at least two microphones, closest to a target talker.

15. The system of claim 13, wherein the changing the configuration comprises:
assigning the first microphone to function as the secondary microphone; and
assigning the second microphone to function as the primary microphone.

16. The system of claim 13, further comprising adjusting tuning parameters for noise suppression (NS) based on the changed configuration.

17. The system of claim 13, further comprising adjusting tuning parameters for acoustic echo cancellation (AEC) based on the changed configuration.

18. A non-transitory computer-readable storage medium having embodied thereon instructions, which, when executed by at least one processor, perform steps of a method, the method comprising:
detecting a change of conditions for capturing an acoustic signal by at least two microphones, a configuration being associated with the at least two microphones, wherein detecting the change includes detecting presence of at least one of far-end speech, type of background noise, sensitivities of the at least two microphones, seals of the at least two microphones, level of signal-to-noise ratio (SNR) in the acoustic signal, and level of signal-to-echo ratio (SER) in the acoustic signal;
determining that the change of the conditions has occurred for a pre-determined period of time; and
in response to the determining, changing a configuration associated with the at least two microphones.

19. The method of claim 1, wherein based upon detection of the far-end speech, changing the configuration comprises, switching one of the at least two microphones that is farthest from a loudspeaker to be a primary microphone.

20. The method of claim 1, wherein the pre-determined period of time is in a range between and including twenty milliseconds and fifty milliseconds.

* * * * *